United States Patent [19]

Brown et al.

[11] Patent Number: 4,553,075
[45] Date of Patent: Nov. 12, 1985

[54] SIMPLE BRUSHLESS DC FAN MOTOR WITH REVERSING FIELD

[75] Inventors: Fred A. Brown; Alan F. Grouse, both of Woodstock, N.Y.

[73] Assignee: Rotron Incorporated, Woodstock, N.Y.

[21] Appl. No.: 520,154

[22] Filed: Aug. 4, 1983

[51] Int. Cl.[4] .......................................... H02K 29/02
[52] U.S. Cl. ..................................... 318/254; 318/138; 318/439; 310/63; 310/68 R
[58] Field of Search ................... 318/138, 254, 254 A, 318/439; 98/72; 310/62, 63, 68 R

[56] References Cited

U.S. PATENT DOCUMENTS

| | | | |
|---|---|---|---|
| 1,996,195 | 4/1935 | Ferguson | 417/356 |
| 2,472,039 | 5/1949 | Zacharias . | |
| 2,697,986 | 12/1954 | Meagher | 417/366 |
| 3,083,314 | 3/1963 | Ratajski | 310/219 |
| 3,098,958 | 7/1963 | Katz | 318/138 |
| 3,230,434 | 1/1966 | Bauerlein | 318/254 A X |
| 3,242,404 | 3/1966 | Favre | 318/138 |
| 3,264,538 | 8/1967 | Brailsford | 318/138 |
| 3,379,907 | 4/1968 | Hollinger | 310/77 |
| 3,483,456 | 12/1969 | Brunner | 318/138 |
| 3,577,049 | 5/1971 | Madurski | 318/138 |
| 3,626,263 | 12/1971 | McBride . | |
| 3,631,272 | 12/1971 | Kirii | 310/10 |
| 3,662,196 | 5/1972 | Ruschmann | 310/68 B |
| 3,845,334 | 10/1974 | Harada et al. | 310/46 |
| 3,873,897 | 3/1975 | Muller . | |
| 3,891,905 | 6/1975 | Müller | 310/68 X |
| 3,909,647 | 9/1975 | Peterson . | |
| 4,130,769 | 12/1978 | Karube | 310/46 |
| 4,164,690 | 8/1979 | Müller et al. | 318/254 A |
| 4,358,245 | 11/1982 | Gray | 416/189 |
| 4,371,817 | 2/1983 | Muller . | |
| 4,373,148 | 2/1983 | Gutz | 318/254 |
| 4,379,984 | 4/1983 | Muller . | |
| 4,405,885 | 9/1983 | Okamoto . | |
| 4,459,087 | 7/1984 | Barge . | |

FOREIGN PATENT DOCUMENTS 0018904 11/1980 European Pat. Off. ............ 318/254
3026797 2/1982 Fed. Rep. of Germany ...... 318/254

OTHER PUBLICATIONS

Air Currents, vol. 2, No. 1, Rotron, Inc., Copyright 1977.
Michael Oppenheimer, "In IC form, Hall-Effect Devices Can Take on Many New Applications", *Electronics*, Aug. 2, 1971, pp. 46-49.
Jearl Walker, "The Amateur Scientist", *Scientific American*, Mar., 1982, pp. 142-152.

*Primary Examiner*—William M. Shoop, Jr.
*Assistant Examiner*—Bentsu Ro
*Attorney, Agent, or Firm*—Brumbaugh, Graves Donohue & Raymond

[57] ABSTRACT

A simplified fan and brushless DC motor employs an annular permanent magnet magnetized in segments about its circumference. Each segment is oppositely radially magnetized with respect to its adjacent segments. Fan blades are located within the annular magnet. A coil comprising two electrically independent and bifilar wound windings, connected to be oppositely energized, and an electromagnet structure defining two pole pieces reside outside the permanent magnet annulus. A Hall effect device alternately energizes the separate coil windings in response to passage of the segments of the rotor magnet to alternately produce opposite magnetic fields in the pole pieces. Thus commutated, the double coil arrangement affects rotation of the rotor and the fan blades.

21 Claims, 3 Drawing Figures

SIMPLE BRUSHLESS DC FAN MOTOR WITH REVERSING FIELD

BACKGROUND OF THE INVENTION

This invention relates to brushless DC motors electronically commutated and more particularly to brushless DC fan motors that are of simple construction, inexpensive to manufacture, and reliable.

A typical goal in the manufacture of fans is a motor that is very simple and consequently has a low manufacturing cost. In AC motors for fans, the side armature AC motor comes closest to achieving these goals. However, recently, DC motors for fans have become more and more attractive, particularly for fans used to cool electronics where DC power is available.

Brushless DC motors using Hall effect devices to sense the commutation points as the rotor rotates are well known in the art. One or more stator coils are repeatedly energized or have their energization reversed to effect relocation of the electromagnetic field produced by poles of the stator core. A permanent magnet rotor is continuously attracted to the new electromagnetic pole locations. For commutation, one or more Hall effect devices sense the location of the poles of the rotor permanent magnet to control the energization of the stator winding or windings, or a Hall device detects the position of one or more commutation magnets mounted to rotate with the rotor and provided especially to indicate, the changing the state of the Hall device, the commutation points as the rotor turns.

Many brushless DC motors have been complex in both their structure and their commutation circuitry. Where simple, low cost and reliable fan motors have been needed these brushless DC motors, which might more appropriately have been used for, say, precise disc or tape drives, have been too expensive for the simple purpose of fan rotation.

One type of simple DC brushless motor is described in U.S. patent application Ser. No. 416,504 filed Sept. 10, 1982, now abandoned, and assigned to the assignee of the present invention. The motor in the prior application comprises a rotor with an annular permanent magnet and a stator coil and electromagnet structure outside the annular magnet. The annular magnet of the rotor has oppositely polarized magnet segments alternately arranged about the rotor's circumference. The electromagnet structure includes pole pieces proximate the outer cylindrical surface of the rotor, and are magnetized by a coil with a single winding. A Hall effect device senses the passage of the rotor magnet segments to turn the single coil on and off. The location of the electromagnet pole pieces and of the Hall effect device are such that, each time the coil is energized, the correct polarities are established at the pole pieces to attract the next approaching segments or poles of the annular magnet. The coil is thus pulsed on when the polarities of the magnet segments approaching the poles are opposite to the poles, but is turned off when these polarities are the same as that of the poles. Therefore, for a rotor magnet having for example four magnet segments of each polarity, eight segments in all, spaced around the magnet, the coil will be pulsed on four times per magnet revolution. For a rotor magnet having equally sized segments of opposite polarity, the coil will be off for a total of one-half of the magnet revolution time.

In this prior motor design, because the rotor could stop in a "winding off" position, a permanent detent magnet is provided on the stator structure close to the periphery of the annular rotor magnet. This magnet magnetically detents the annular magnet so that the rotor is correctly positioned for start-ups. However, it has been found that the motor experiences vibration due to the interaction of the rotating magnet with the detent magnet and the pulsing winding, thus producing a torque ripple.

SUMMARY OF THE INVENTION

In accordance with the present invention, a simple DC brushless motor has a rotor with an annular permanent magnet and a stator coil and electromagnet structure outside the annular magnet, but unlike the motor of the aforementioned patent application there are no "off" locations, the coil being energized to produce reversing fields. The annular magnet of the rotor is magnetized in segments about its circumference, each succeeding segment being oppositely magnetized in the radial direction, the electromagnet structure includes pole pieces magnetized by the coil and closely proximate the outer cylindrical surface of the annular magnet, and a Hall effect device senses the passage of the rotor magnet segments to alternately energize the coil to produce opposite polarity magnetic fields. The locations of the electromagnet pole pieces and of the Hall effect device are such that, when the coil is energized to produce a particular magnetic field, the correct magnetic polarities are established at the pole pieces to attract the next approaching segments or poles of the annular magnet.

Preferably, the stator coil comprises two electrically independent coil windings wound together in bifilar fashion on a single bobbin and connected to be oppositely energized. A commutation circuit including the Hall device alternately energizes the two windings to alternately produce oppositely polarized fields at the pole pieces. In this manner, the stator coil produces a magnetic field substantially throughout the entire period of revolution of the rotor, as compared to the motor design of the above-referenced patent application wherein the coil is energized only during about one-half of the rotor revolution period. Further, as compared to the motor design of the above-referenced patent application with a similar power output, the motor according to the invention exhibits reduced peak currents during operation and lower locked rotor current. Moreover, since the coil is not deenergized during the passage of each magnet segment of a particular polarity, as in the motor of the above-referenced application, these are no longer the relatively large arcuate rotor locations wherein no torque is applied to the rotor, and the need for a detent magnet to prevent the rotor from coming to rest in one of these locations is obviated. Without a detent magnet, torque ripple and attendant vibration and noise are substantially reduced.

In the fan of the invention, fan blades are located within and affixed to the annular magnet in the improved motor described above. As in the aforementioned application, the magnet and the fan blades are mounted for rotation at a central hub, the stator includes a housing and support structure extending from proximate the magnet to the hub and supporting the rotor hub for rotation, the housing encircles the annular magnet and the fan blades, the support structure includes mounting means formed in the housing about the periphery of the motor, and a small compartment in the housing houses the stator coil or windings, the electromagnet structure, and all circuit elements of the relatively simple switching circuitry, including the commutation-effecting Hall device. However, by virtue of the features of this invention a significantly quieter fan results and still at low cost.

The above and further features of the invention will be better understood with reference to the attached drawings and the following detailed description of a preferred embodiment.

DETAILED DESCRIPTION OF THE PREFERRED EMBODIMENT

Figures 1, 2:
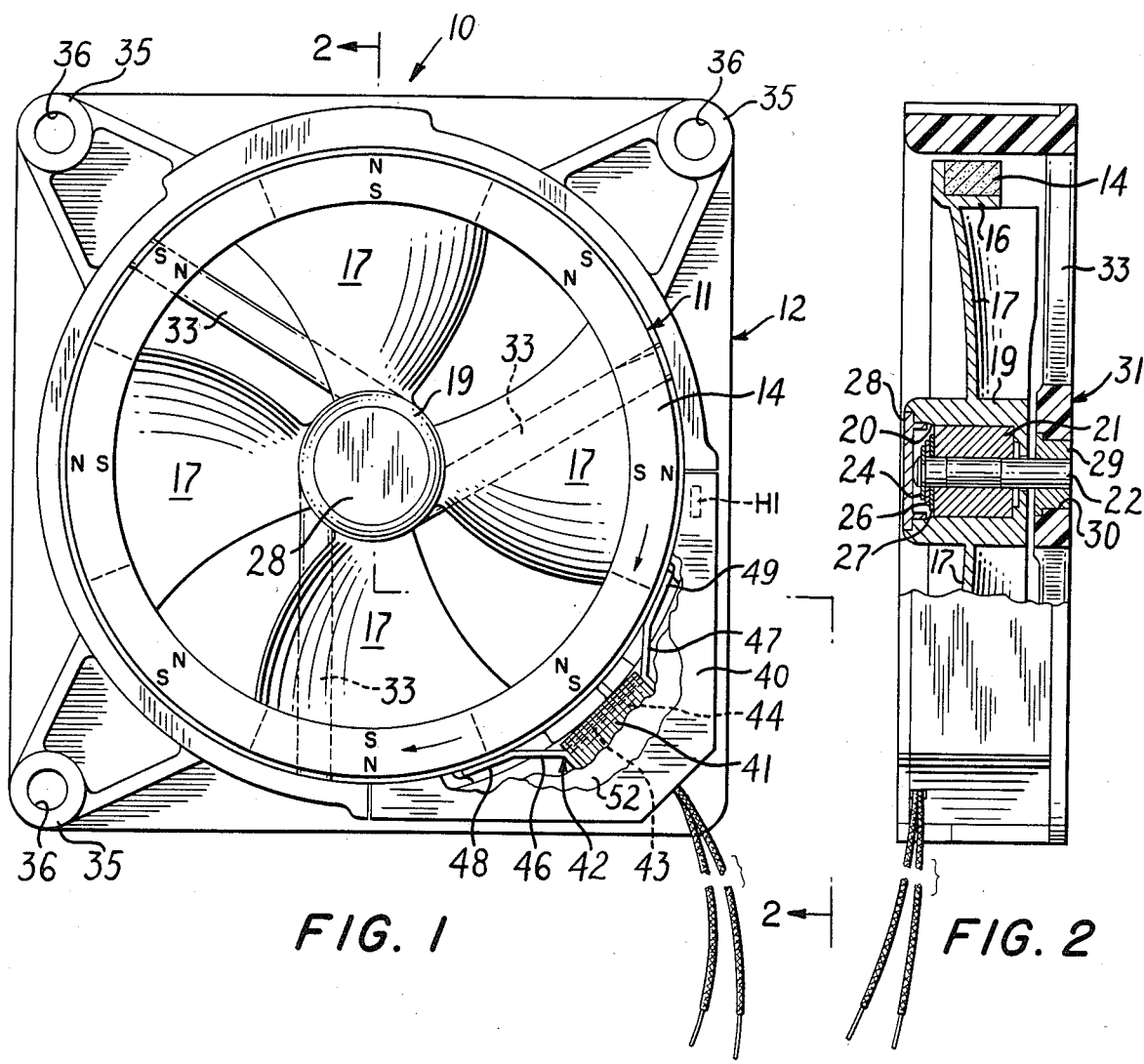
FIG. 1 is a top plan view of a fan and motor according to the invention, and shows the rotor's annular permanent magnet magnetized in segments about its periphery and an external coil structure and electromagnet stator structure.
FIG. 2 is a side elevational view of the fan and motor of FIG. 1, partially in section, along the line 2—2 of FIG. 1, and illustrates the mounting of the rotor and fan blades on a hub for rotation about a central support section of the stator coil structure.

As shown in FIG. 1, a fan and motor combination 10 according to the invention includes a rotor 11 and a stator 12. The rotor 11 has an annular permanent magnet 14, magnetized in segments about its circumference. As illustrated, each succeeding segment about the circumference is oppositely magnetized in the radial direction. The magnet 14 is secured on a ring 16 having an L-shaped cross-section as shown in FIG. 2. Fan blades 17 extend radially inwardly from the ring 16 to a central hub 19.

As shown in FIG. 2, the hub 19 defines a bore 20 which receives a sleeve bearing 21 which in turn receives a shaft 22. The shaft 22 is retained in bearing 21 by means of retaining C-ring 24 and thrust washers 26 and 27. An end cap 28 covers the left end of the shaft 22. The right end of the shaft 22 is securely mounted in a mounting bushing 29, which is itself securely received in a mounting bore 30 of a stator housing 31. The particular mounting employed to locate the rotor assembly and fan blades rotatably within the stator housing structure is exemplary only and should not be construed as essential to the invention.

Three strut members 33 connect to and radiate outwardly from the center of stator housing 31. Mounting bosses 35 (FIG. 1) define holes 36 about the periphery of the housing, enabling the entire motor and fan to be mounted by, e.g., bolts passed through the holes 36.

As seen at the bottom of FIG. 1, at one of its corners the stator housing 31 forms a compartment 40 housing a stator coil 41, electromagnet structure 42, a Hall effect device H1, and the remaining circuit elements of the commutation circuit, not shown in FIG. 1. The stator coil 41 comprises two electrically independent windings L1 and L2 concentrically wound on a bobbin 43 in bifilar fashion. A core 44 of magnetic material extends through the bobbin from end to end and forms a part of the electromagnet structure 42. Alternatively, the bobbin can be a part of the electromagnet structure. The electromagnet structure also includes a pair of arms or shoes 46 and 47 secured in flux conducting relation to the magnetic core 44 and terminating in respective pole pieces 48 and 49 closely proximate the outer surface of the permanent magnet 14. As can be seen in FIG. 1, the spacing of the pole pieces 48 and 49 is such that, with the magnet located as shown, energization of the coil 41 to make pole piece 48 north and pole piece 49 south will affect clockwise rotation of the rotor structure and the fan blades.

At start-up, the coil 41 is energized to apply, via the pole pieces 48 and 49, starting torque to the annular magnet. The Hall effect device H1 controls energization of the coil 41 such that the respective coil windings L1 and L2 are alternately energized to attract approaching poles of the annular rotor magnet. When the Hall effect device H1 detects changing of the magnetic field produced by the rotor 11 due to the arrival of a new, oppositely magnetically polarized segment into proximity with the device H1, the magnetic field at the annular permanent magnet is reversed by means of the circuit of FIG. 3 to attract the poles of the annular rotor magnet next approaching. This sequence repeats itself until the rotor comes to an equilibrium speed where the aerodynamic load balances the motor power.

No detent magnet is necessary to draw the rotor away from relatively large angular ranges of positions of the rotor where the stator coil is not energized, as in the motor of the above-referenced earlier application. Nevertheless, it may be desirable to prevent cogging, the condition in which, at start up, the rotor is in a position in which forces thereon are in equilibrium and starting will not occur. To this end, a piece of magnetic metal (not shown), unmagnetized steel for example, may be located on the stator proximate the path of travel of the rotor magnet, and at a position easily empirically determined, to attract the rotor to an at-rest position angularly removed from the motor-cogged position.

Figure 3:
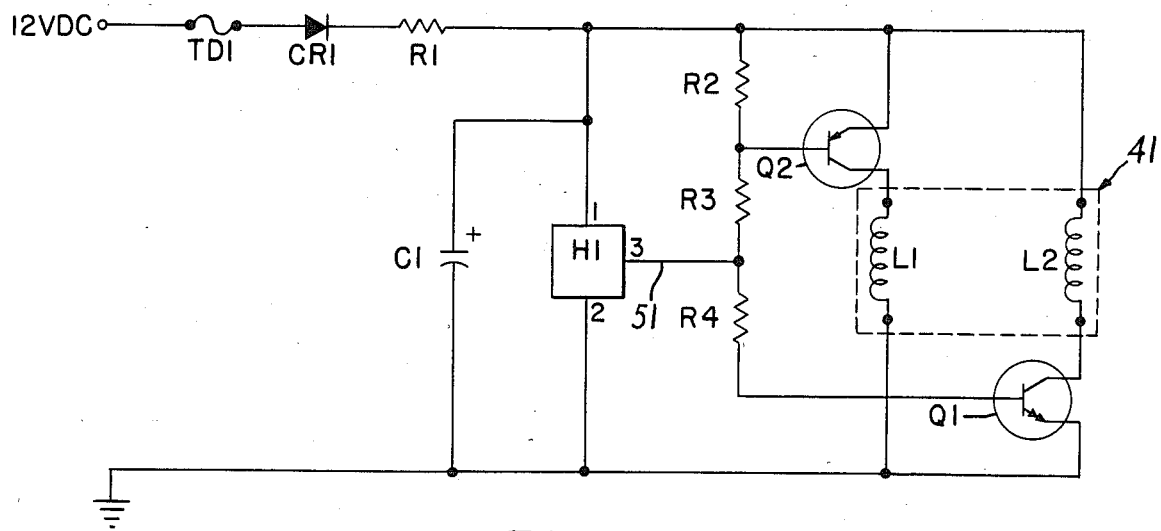
FIG. 3, is a schematic diagram of an energizing circuit for the stator coil structure.

This operation allows use of a simplified commutation circuit. In FIG. 3, the Hall device H1, which can be a Hall switch, for example, is seen controlling transistors Q1 and Q2, each of whose collector-emitter circuit is in series with a different one of coil windings L1 and L2. One such Hall switch which may be used is the Hall effect digital switch UGN-3013T of Sprague Electric Co., Worcester, Mass. Exposure of the Hall effect device H1 to a magnetic field of one direction or polarity opens (breaks) a conduction path from a line 51 (pin 3) to ground (pin 2), while exposure of the device H1 to an opposite polarity closes (makes) a conduction path from line 51 to ground.

When the path is open, there is very little voltage drop across resistors R2, R3 and R4, and the Q1 base-emitter voltage is sufficient to turn on Q1, which is an NPN Darlington pair, commonly housed and sold as a single component. The Q1 Darlington pair has a high gain so that the small base current through R2, R3 and R4 is adequate to turn on Q1 and energize the winding L2. When the path through H1 is open, the Q2 base-emitter voltage is insufficient to turn on Q2, a PNP power transistor that requires a greater base drive to conduct. So with Q2 off, no current flows through winding L1. When the Hall effect device H1 experiences a magnetic field of opposite direction or polarity, connecting line 51 to ground, a voltage drop nearly equal to the full input voltage, for example about 12 volts, appears across resistors R2 and R3, creating a Q2 base-emitter voltage sufficient to turn on Q2. Conduction by Q2 causes current to flow through winding L1. However, the Q1 base-emitter voltage is insufficient to turn Q1 on, so that no current flows through winding L2. Windings L1 and L2 are thus altenatively energized and deenergized in response to detection of different magnetic fields by Hall device H1. Instead of providing two separate coil windings L1 and L2, only one winding may be provided along with circuit means to alternately reverse the current in the winding.

The remainder of the FIG. 3 circuit comprises capacitor C1, which damps transients that arise from the abrupt switching of the coil 41, a current limiting resistor R1, appropriate protective fusing such as fuse TDI, and diode CR1, which prevents current reversals back through the input leads to the supply. In a preferred embodiment, the circuit elements are mounted on a printed circuit board 52 (FIG. 1) of essentially the same shape as the cavity that forms the compartment 40 in FIG. 1. The circuit board is supported above the cavity with the circuit elements projecting downward and housed within the cavity so that the fan and motor has the compact shape seen in FIG. 1 and the narrow profile shown in FIG. 2.

From the foregoing it will be seen that a novel arrangement of a motor and fan has been provided. It will be readily apparent to those skilled in the art that many variations in the foregoing exemplary embodiment can be made without departing from the spirit and scope of the invention, as defined in the appended claims.

What is claimed is:

1. A DC motor comprising:
   a rotor with an annular permanent magnet defining magnetic segments oppositely polarized in the radial outward direction, wherein said segments are arranged circumferentially to comprise the magnet, and wherein the rotor is free of encircling stator iron;
   a stator having an electromagnet structure outside said annular magnet, proximate the periphery thereof, said electromagnet structure including coil means comprising a core having two electrically independent coil windings wound thereon, said electromagnetic structure further including electromagnetic flux conducting means in flux conducting relation to the coils and core and located for establishing magnetic fields of opposite polarities to attract the oppositely polarized segments of, and for applying continuous rotational torque to, the annular magnet; and
   position detecting means located outside said annular magnet for detecting the position of the rotor relative to the stator and for commutating electrical current to the coil means to repeatedly produce said opposite polarity fields and attract said segments in dependence on said relative positioning.

2. The motor according to claim 1, wherein the rotor is free of encircling stator windings and wherein the electromagnetic flux conducting means defines at least one pole piece of flux conducting material terminating adjacent the exterior of the annular magnet.

3. The motor according to claim 1, further including commutation circuit means connected to said position detecting means and to said coil means for reversing the field polarity at the approach of each oppositely polarized magnet segment to the position detecting means, whereby said coil means is energized to produce the alternating field throughout substantially all of the 360° of rotor movement.

4. The motor according to claim 1, wherein the electromagnet structure includes a flux path having a pair of arms in magnetic flux conducting relation with the coil means and extending to two pole pieces spaced apart along the circumference of the annular magnet.

5. The motor according to claim 4, wherein the pole pieces are spaced apart by such a distance as to each attract a separate magnetized segment of the annular magnet when the coil means is energized.

6. The motor according to claim 5, wherein adjacent segments of the annular magnet are oppositely polarized, and wherein the pole pieces are located to attract the adjacent, oppositely polarized segments when the coil means is energized.

7. The motor according to claim 1, wherein the coil means comprises two electrically independent coil windings which produce magnetic fields of opposite polarities when energized, the detecting means comprises means for commutating electrical current to a different coil winding to produce said opposite polarity fields and attract said segments in dependence on said relative positioning.

8. The motor according to claim 1, wherein the two coil windings are concentrically wound on said core.

9. A fan having a motor according to claim 1, the fan having blades located within the annular magnet.

10. A fan according to claim 9, wherein the fan blades extend from proximate the inside surface of the annular magnet to a central hub, said stator having a central member supporting, for rotation, the hub, the blades, and the rotor members, including the annular magnet, the stator further including struts extending outwardly from the central stator member to a housing encircling the fan blades, said housing supporting the coil proximate the annular rotor magnet and adjacent the outer surface thereon.

11. A fan having a motor according to claim 1, including a central rotatable hub and fan blades radiating outwardly from the hub, said permanent magnet encircling the blades of the fan and secured to the blades, a housing encircling the annular permanent magnet, and wherein the stator coil and electromagnet structure is supported by the housing outside the annular magnet commutation means responsive to the position of the permanent magnet to repeatedly and alternately energize the coil windings to apply a rotary force to segments of the annular.

12. A DC motor comprising:
   a rotor with an annular permanent magnet defining magnetic segments oppositely polarized in the radial outward direction, wherein said segments are arranged circumferentially to comprise the magnet;
   a stator having an electromagnet structure outside said annular magnet, proximate the periphery thereof, said electromagnet structure including two electrically independent coil windings and electromagnetic flux conducting means in flux conducting relation to the coil windings and located for establishing magnetic fields of opposite polarities to attract the oppositely polarized segments of, and for applying rotational torque to, the annular magnet when the coil windings are energized;
   position detecting means located outside said annular magnet for detecting the position of the rotor relative to the stator and for commutating electrical current to a different coil winding to repeatedly produce said opposite polarity fields and attract said segments in dependence on said relative positioning; and wherein the means for commutating current includes at least a first transistor means connected in current conducting relation to a first of said windings, and at least a second transistor means in current conducting relation to the second of said windings, resistance means for establishing biases to the first and second transistor means and said position detecting means comprising a Hall device responsive to a magnetic field of the magnetic segments of one polarity for providing bias from the resistance means to the first transistor means to cause conduction therein while depriving the second transistor means of bias to prevent conduction therein, and responsive to the absence of said field for providing bias from the resistance means to the second transistor means to cause conduction therein while depriving the first transistor means of bias to prevent conduction thereof.

13. The motor according to claim 12, wherein each transistor means connected in series with its associated winding across motor input voltage connections, the resistance means comprises resistors in series and connected with at least one of the motor input voltage connections, and connected with terminals of the transistors to bias the first or second transistor means into conduction upon establishment of appropriate bias voltage across the resistors, and the Hall device comprises a Hall switch connected between a junction of the resistors and one of the motor input voltage connections, said Hall switch being connected with the resistors to bypass at least one resistor in the presence of said field of magnetic segments of one polarity and to thereby alter the bias provided by the resistors to the transistor means.

14. A motor according to claim 13, wherein the first transistor means is a PNP transistor connected between a high side of the motor input connections and the first winding, and the second transistor means is an NPN Darlington transistor pair connected between a low side of the motor input connections and the second winding, both of said transistor means having their bases connected to the resistance means for control by the Hall switch.

15. A motor according to claim 13, wherein the first transistor means is a power transistor means requiring a relatively high drive to cause conduction therein and the second transistor means is a high gain transistor means requiring a relative low drive to cause conduction therein, said resistor in series providing the relatively low drive to the second transistor means when the Hall switch is open and the Hall switch being connected to place a relatively large voltage drop across at least a portion of the resistors in series when closed, thereby to substantially short the bias to the high gain transistor means and supply the relatively high bias to the power transistor means.

16. A DC motor comprising:
a rotor with an annular permanent magnet defining magnetic segments oppositely polarized in the radial outward direction, wherein said segments are arranged circumferentially to comprise the magnet;
a stator having an electromagnet structure outside said annular magnet, proximate the periphery thereof, said electromagnet structure including two electrically independent and concentrically wound coil windings, and wherein the electromagnetic structure defines at least one pole piece and wherein the coil windings are wound on a core in electromagnetic flux conducting relationship to the pole piece and located for establishing magnetic fields of opposite polarities to attract the oppositely polarized segments of, and for applying rotational torque to, the annular magnet; and
position detecting means located outside said annular magnet for detecting the position of the rotor relative to the stator and for commutating electrical current to the coil means to repeatedly produce said opposite polarity fields and attract said segments in dependence on said relative positioning.

17. A DC motor comprising:
a rotor with an annular permanent magnet defining magnetic segments oppositely polarized in the radial outward direction, wherein said segments are arranged circumferentially to comprise the magnet;
a stator having an electromagnet structure outside said annular magnet, proximate the periphery thereof, said electromagnet structure including coil means comprising a core having two electrically independent coil windings wound thereon, said electromagnetic structure further including electromagnetic flux conducting means in flux conducting relation to the coils and core and located for establishing magnetic fields of opposite polarities to attract the oppositely polarized segments of, and for applying rotational torque to, the annular magnet, wherein the stator includes a housing defining a compartment at one location on the periphery of the path of rotation of the annular magnet, and wherein said coil means is located in said compartment; and
position detecting means located outside said annular magnet for detecting the position of the rotor relative to the stator and for commutating electrical current to the coil means to repeatedly produce said opposite polarity fields and attract said segments in dependence on said relative positioning.

18. The motor according to claim 17, wherein said coil means has two windings, wherein said compartment houses the position detecting means for detecting and commutating, and wherein the position detecting and commutating means includes a Hall effect device located proximate the annular magnet, and switching circuit means for energizing one coil winding when magnetized segments of a first polarity are adjacent the Hall effect device, and for energizing the other coil winding when magnetized segments having a second polarity opposite said first polarity are adjacent the Hall effect device.

19. The motor according to claim 17, wherein the stator housing encircles the annular magnet.

20. A DC motor comprising:
a rotor with an annular permanent magnet defining magnetic segments oppositely polarized in the radial outward direction, wherein said segments are arranged circumferentially to comprise the magnet;
a stator having an electromagnet structure outside said annular magnet and proximate the periphery thereof, and wherein the stator electromagnet structure is located in a location to one side of the annular magnet and extends less than 180° around the magnet, said electromagnet structure including coil means comprising a core having two electrically independent coil windings wound thereon, said electromagnetic structure further including electromagnetic flux conducting means in flux conducting relation to the coils and core and located for establishing magnetic fields of opposite polarities to attract the oppositely polarized segments of, and for applying rotational torque to, the annular magnet; and position detecting means located outside said annular magnet for detecting the position of the rotor relative to the stator and for commutating electrical current to the coil means to repeatedly produce said opposite polarity fields and attract said segments in dependence on said relative positioning.

21. A DC motor comprising:

a rotor with an annular permanent magnet defining magnetic segments oppositely polarized in the radial outward direction, wherein said segments are arranged circumferentially to comprise the magnet;

a stator having an electromagnet structure outside said annular magnet and proximate the periphery thereof, and wherein the stator electromagnet structure is located in a location to one side of the annular magnet and extends less than 90° around the magnet, said electromagnet structure including coil means and electromagnetic flux conducting means in flux conducting relation to the coil and located for establishing magnetic fields of opposite polarities to attract the oppositely polarized segments of, and for applying rotational torque to, the annular magnet; and position detecting means located outside said annular magnet for detecting the position of the rotor relative to the stator and for commutating electrical current to the coil means to repeatedly produce said opposite polarity fields and attract said segments in dependence on said relative positioning.

* * * * *

UNITED STATES PATENT AND TRADEMARK OFFICE
CERTIFICATE OF CORRECTION

PATENT NO. : 4,553,075

DATED : November 12, 1985

INVENTOR(S) : Fred A. Brown, Alan F. Grouse

It is certified that error appears in the above-identified patent and that said Letters Patent is hereby corrected as shown below:

Column 1, line 30, "the" (first occurrence) should read –by–.

Column 6, lines 42-45, delete "commutation means...of the annular"

Column 10, line 12, "position detecting..." should start a new paragraph

Signed and Sealed this

Eighth Day of April 1986

[SEAL]

Attest:

DONALD J. QUIGG

Attesting Officer

Commissioner of Patents and Trademarks